US006769187B2

(12) United States Patent

King

(10) Patent No.: US 6,769,187 B2
(45) Date of Patent: Aug. 3, 2004

(54) CHAIN SAW BRAKING SYSTEM

(76) Inventor: William C. King, 15185 Buchanan Trail W., Mercerburg, PA (US) 17236

( * ) Notice: Subject to any disclaimer, the term of this patent is extended or adjusted under 35 U.S.C. 154(b) by 0 days.

(21) Appl. No.: 09/853,942

(22) Filed: May 11, 2001

(65) Prior Publication Data

US 2002/0053270 A1 May 9, 2002

Related U.S. Application Data

(60) Provisional application No. 60/245,939, filed on Nov. 6, 2000.

(51) Int. Cl.7 .......................... B23D 57/02; B27B 17/02

(52) U.S. Cl. .......................... 30/383; 30/381; 188/65.1

(58) Field of Search .......................... 30/383, 387, 381, 30/382, 384, 385, 386; 83/820; 188/65.1

(56) References Cited

U.S. PATENT DOCUMENTS

| | | | | |
|---|---|---|---|---|
| 2,316,997 A | * | 4/1943 | Smith | 30/385 |
| 3,331,407 A | * | 7/1967 | Merz | 30/387 |
| 3,390,710 A | * | 7/1968 | Cookson et al. | 30/381 |
| 3,485,326 A | * | 12/1969 | Wilkin | 188/65.1 X |
| 3,485,327 A | * | 12/1969 | Gudmundsen | 188/65.1 X |
| 3,793,727 A | | 2/1974 | Moore | 30/383 |
| 4,486,953 A | * | 12/1984 | Halverson | 30/385 |
| 4,611,401 A | | 9/1986 | Piller | 30/387 |
| 4,924,577 A | | 5/1990 | Leini | 30/387 |
| 5,101,567 A | | 4/1992 | Cool | 30/382 |
| 5,445,365 A | | 8/1995 | Förderer | 267/137 |

* cited by examiner

*Primary Examiner*—Clark F. Dexter
(74) *Attorney, Agent, or Firm*—James D. Welch

(57) ABSTRACT

A chain saw chain braking system, positioned in a continuous channel guide through which chain linking elements slide freely during use, unless the slidability is impeded by its operation.

11 Claims, 3 Drawing Sheets

CHAIN SAW BRAKING SYSTEM

This Application is a CIP of Provisional Patent Application Serial No. 60/245,939, filed Nov. 6, 2000.

TECHNICAL AREA

The present invention relates to chain saws, and more particularly to a system and method for applying braking to a cutter providing chain thereof.

BACKGROUND

Chain saws are well know means for cutting wood and the like and used properly can greatly reduce work, however, if not used carefully user injury can occur. As a result, safety features are desirable. Critical to safety is the capability of a chain saw system to stop a blade or cutter containing chain from moving when its motor is running, but the chain saw is not being applied to useful work. That is, efficient chain saw chain braking systems provide utility. In that light it is generally disclosed at this point that the present invention is a new braking system and method for braking chain saw chain motion.

With an eye to the present invention a Search of Patents was performed. A U.S. Pat. No. 5,101,567 to Cool was identified and describes a braking mechanism (40) and brake lever (42).

U.S. Pat. No. 3,793,727 describes a system in which two handles must be engaged against the chain saw frame to allow the chain to move. If either is released the chains stops.

U.S. Pat. Nos. 4,924,577 and 4,611,410 are included to show that the Chain Guide can be split in a way that allows extending the length thereof by adding sections.

U.S. Pat. No. 5,445,365 to Forderer shows application of a "dumbell" element, but its applied as a connection element, rather than a means to line-up ends of a Slit Chain Saw Chain Guide.

Even in view of the prior art, need remains for additional systems and methods to prevent, or stop chain saw chain motion once initiated.

DISCLOSURE OF THE INVENTION

Chain saws are very low torque, but high speed systems that derive cutting ability by generating high chain speed. That is, at a given torque, the cutting power is directly proportional to chain speed. It is therefore common to stall a chain saw in use due to minor chain pinching, taking too big a "bite" of, or causing too much force on, an item being cut. A similar result occurs when too high a chain tension is caused to exist, etc. It is this insight which led to the present invention, which is based in the fact that Chain Saws are constructed so that Blade Containing Links in a Chain Saw Chain are slideably mounted in an essentially centrally positioned Continuous Chain Channel Guide in Upper and Lower surfaces of an Elongated Support, via chain link mating elements, such that in use the Blades or Cutters on said chain can be caused to slideably travel in an elongated "circle" around said Upper and Lower surfaces of said Elongated Support. In use the outer Blades or Cutters are caused to contact something to be cut as said Chain is caused to so move. It is also noted that chain saw chains are comprised of links that are interconnected by means such as rivets and that there is some limited lateral "play" possible between links where adjacent Links are so joined to one another.

Now, the present invention innovation, in its preferred embodiment, involves cutting a Slit into the Continuous Chain Channel Guide Upper or Lower surface, (typically the Upper surface near an oil entry port), so that the centrally located Channel region on one side of the resulting Slit can be, when desired, dislocated with respect to the centrally located Channel region on the other side of said Slit.

The purpose is that so, in use, when it is desired to stop the Chain Saw Chain from moving, causing or allowing the identified central Channel dislocation causes spread of adjacent Chain Saw Chain Links, elements of which adjacent Links then collide with edges of a dislocated central Channel region. This, in combination with general frictional interaction caused between the chain and offset channel regions, one side of said Slit to the other, provides effective "Braking", thereby causing the chain saw chain to stop motion.

The preferred embodiments provide for the natural positioning of the centrally located Channel region in one resulting side of the cut Upper or Lower surface of the Elongated Support to be dislocated, (ie. not aligned), with respect to the centrally located Channel region in the other side, such that a User must apply central Channel region aligning force to position the centrally located Channel regions on both sides of the Slit to be aligned, thereby allowing the Blade Containing Links in the Chain Saw Chain to slideably travel in an elongated "circle" around said Upper and Lower surfaces of said Elongated Support.

A preferred embodiment provides for a Dumbell shaped element to effect the alignment of centrally located Channel regions by a User applied force which causes said Dumbell element to move from being positioned on one side of the Slit to a position where it straddles the Slit.

One embodiment provides that the Elongated Support be cut in two places, thereby providing a segment thereof which can be positioned such that the centrally located Channel therein is caused to misaligned with centrally located Channel regions on either side of the two slits.

More precisely, the preferred embodiment of the present invention is a chain saw comprising a motor inside a housing, a blade or cutter providing chain saw chain comprised of links which include chain link mating elements, and an elongated support extending outward from inside said housing, said motor and chain saw chain being functionally interconnected such that operation of said motor applies motion producing force to said chain saw chain. While not of Patentable importance to the present invention, it is noted that the motor and chain saw chain typically are functionally interconnected inside said housing by a sprocket means which is affixed to the motor and engages the chain. Continuing, the outer perimeter surface of said elongated support has present an essentially centrally positioned continuous chain channel guide into which said chain link mating elements slideably insert. As with any conventional chain saw, during normal operation wherein the chain saw is used to cut such as wood etc., said chain link mating elements slide essentially freely through said continuous chain channel guide when forced to do so by operation of said motor. A distinguishing attribute of the preferred embodiment of the present invention, however, is that in a present invention chain saw the continuous chain channel guide has at least one slit present therein which allows effecting an offset of said continuous chain channel guide from one side of the slit to the other, said offset, when caused to be present by an operator, serves to impede the free slide-ability of chain link mating elements across said slit, and in combination with other caused friction based braking effects, prevents in the first place, or stops a chain saw chain's motion.

Again, preferred practice is to have the continuous chain channel guide be in an offset position, from one side of a slit to the other, unless a user purposely, by definite positive action, causes it to be aligned by the operation of an a continuous chain channel guide alignment means, thereby providing a chain saw which impedes the slideability of chain link mating elements across said slit until desired, and specifically effected by a user, and the preferred continuous chain channel guide alignment means is a dumbell shaped element slideably mounted in the elongated support, such that in use said dumbell shaped element causes alignment of the continuous chain channel guide means from one side of the slit to the other, when caused to be located so as to span said slit.

In a modified embodiment the present invention provides that there be a second slit in said continuous chain channel guide which allows effecting an offset of said continuous chain channel guide from one side of said second slit to the other.

Just as for the first slit, preferred practice is to require that said continuous chain channel guide be in an offset position, from one side of said second slit to the other, unless a user causes it to be aligned by operation of continuous chain channel guide alignment means, thereby providing a chain saw which impedes the slideability of chain link mating elements across said slit until desired by a user. While an alignment means which applies to a first slit might be sufficient to align channel regions on either side of two slits, just as for the first slit, when present, the preferred continuous chain channel guide alignment means is a second dumbell shaped element slideably mounted in the elongated support, such that in use said second dumbell shaped element causes alignment of the continuous chain channel guide means from one side of the slit to the other, when caused to be located at and span said slit.

Another modified embodiment of the present invention provides that it is a chain saw comprising a motor inside a housing, a blade or cutter providing chain saw chain comprised of links which include chain link mating elements, and an elongated support extending outward from inside said housing. Again, said motor and chain saw chain being functionally interconnected inside said housing such that operation of said motor applies motion producing force to said chain saw chain. And as before, in the outer surface of said elongated support there being present a continuous chain channel guide into which said chain link mating elements slideably insert, such that during normal operation said chain link mating elements slide essentially freely through said continuous chain channel guide when forced to do so by operation of said motor. Said modified embodiment, however, provides that said continuous chain channel guide has means present therein which allows effecting an impeded chain channel guide, said means which allows effecting an impeded chain channel guide, serving to, when operated, impede the slideability of chain saw chain therethrough. As before, said means which allows effecting an impeded chain channel guide can comprise at least one slit laterally thereacross, but in the modified embodiment comprises any means which allows effecting an impeded chain channel guide, such as at least one collapsible wall region comprised of, for instance, laminations which move when pressure is applied thereto, or perhaps at least one insertional element which is entered thereinto through a means for entering an insertional element, (which means can comprise a separate portion of said wall), or any functionally equivalent means which enables applying friction to a chain saw chain to slow and stop its motion.

The present invention will be better understood by reference to the Detailed Description, in conjunction with the Drawings.

SUMMARY OF THE INVENTION

It is therefore a primary objective and/or purpose of the present invention to provide a new braking system for chain saw chains.

It is another objective and/or purpose of the present invention to teach the entering of a slit into an elongated support, in perimeter surfaces of which is located a continuous chain channel guide into which chain link mating elements are slideably inserted.

It is yet another objective and/or purpose of the present invention to teach that the a continuous chain channel guide on one side of a slit should be offset from that on the opposite side thereof, when chain braking is to be effected.

It is another objective and/or purpose yet of the present invention to teach that a preferred continuous chain channel guide alignment means for aligning continuous chain channel guide regions on either side of a slit is a second dumbell shaped element which is slideably mounted in the elongated support.

It is still yet another objective and/or purpose of the present invention to teach the entering of any means which allows effecting an impeded chain channel guide, for use in effecting braking to a chain saw chain which is slideably mounted in said continuous chain channel guide into which chain link mating elements are slideably inserted.

Other objectives and/or purposes of the present invention will be obviated by a reading of the Specification and Claims.

DETAILED DESCRIPTION

Figure 1C:
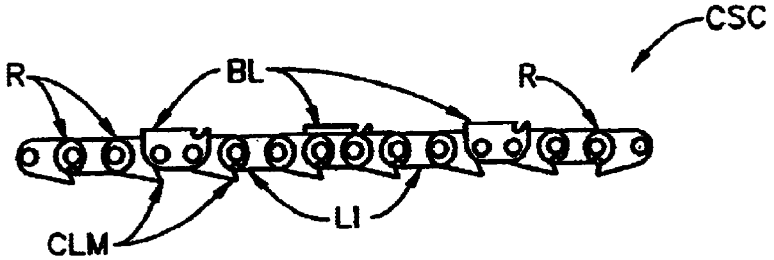
FIG. 1*c* shows an enlarged view of a typical chain saw chain, showing blades or cutters and chain link mating elements (CLM).
Figure 1A:
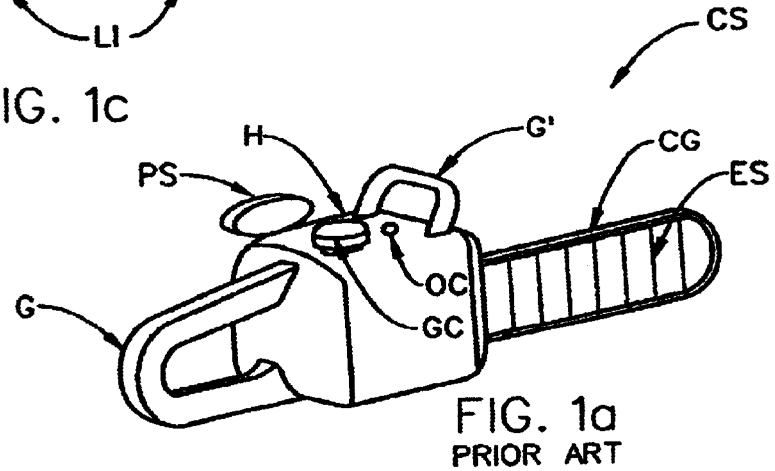
FIG. 1a PRIOR ART
FIG. 1*a* shows a perspective view representation of a typical chain saw (CS) including a Motor in a housing (H), Pull Starter (PS), Gas Cap (GC) and Grips (G) and (G'), Elongated Support (ES) and the Continuous Chain Channel Guide (CG).

Turning now to the Drawings, FIG. 1*a* shows a perspective view representation of a typical conventional Chain Saw (CSO) including a Motor contained in a housing (H), Pull Starter (PS), Gas Cap (GC), Oil Cap (OC) and Grips (G) and (G'). The aspects in FIG. 1*a* which are important to the present invention are the Elongated Support (ESO) and the Continuous Chain Channel Guide (CGO) in the outer perimeter surface thereof, (see FIG. 2*a* for better detail of a Continuous Channel Guide (CG) in an Elongated Support (ESO) which is modified by the present invention). For general interest, FIG. 1*c* shows an enlarged view of a Chain Saw Chain showing Links (LI) with Blades or Cutters (BL) affixed thereto, and further showing the presence of Chain Link Mating Elements (CLM) which in use slideably insert into the Continuous Chain Channel Guide (CGO) (CG). It is to be understood that adjacent Links (LI) in the Chain Saw Chain are interconnected as by means such as Rivets (R), and that said interconnection means allow for limited lateral motion between adjacent links.

Figure 1B:
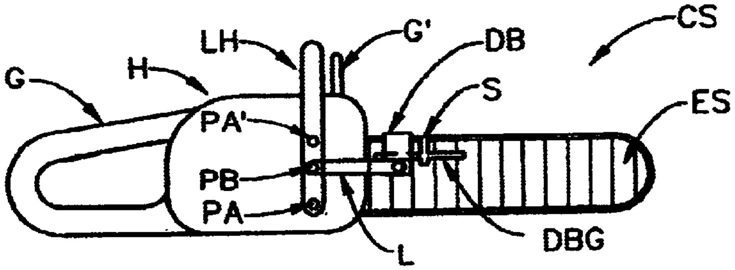
FIG. 1*b* shows the chain saw of FIG. 1 modified to include elements Slit (S) and Dumbell Guide (DBG) which comprise the present invention.
Figure 2A:
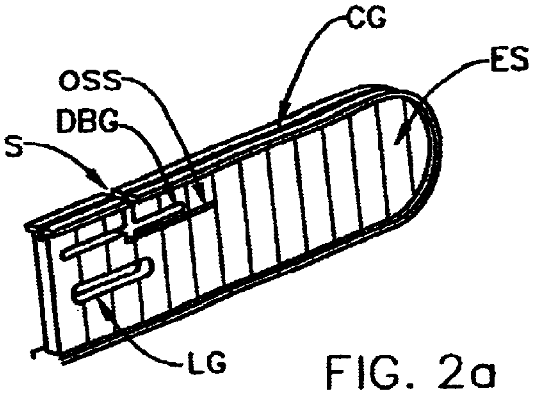
FIG. 2*a* shows a perspective partial view of the Elongated Support (ES) and Continuous Chain Channel Guide (CG) in FIG. 1*a* near where it enters the Motor containing housing (H).
Figure 2B:
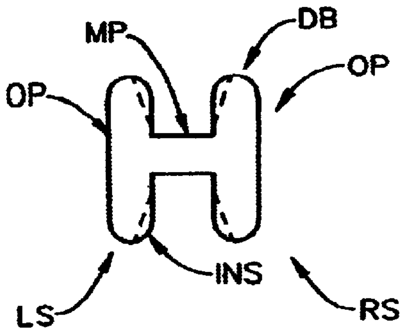
FIG. 2*b* shows a Dumbell Shaped Element (DB) which is a preferred Continuous Chain Channel Guide Alignment Means.
Figure 3:
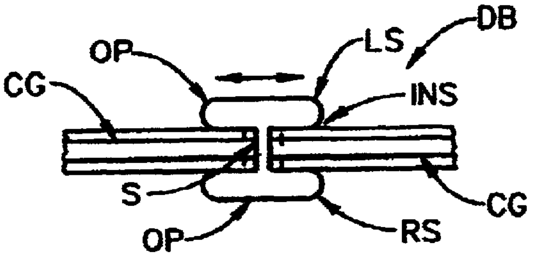
FIG. 3 provides an enlarged Top view showing application of a Dumbell Shaped Element (DB) positioned to effect alignment of a Continuous Chain Channel Guide.
Figure 4:
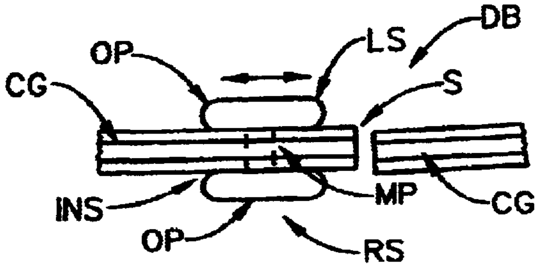
FIG. 4 shows an enlarged Top view showing Dumbell Shaped Element (DB) positioned to allow non-alignment of a Continuous Chain Channel Guide.

FIG. 2*a* shows a perspective partial view of the Elongated Support (ES) and Continuous Chain Channel Guide (CG) similar to that of FIG. 1*a*, near where it enters the Motor containing housing (H). Note the presence of a Slit (S) which is not present in conventional Chain Saw Elongated Supports (ES), as well as a Dumbell Guide (DBG), the purposes of which will be described with respect to FIGS. 1*b* and 6. Before turning to FIGS. 1*b* and 6, however, attention is directed to FIGS. 3 and 4 which show a Top view looking down from above at the Continuous Chain Channel Guide (CG) and further indicates the Slit (S) in FIG. 2*a*, in combination with a preferred Continuous Chain Channel Guide Alignment Means, (Ie. Dumbell Shaped Element (DB)). Said Dumbell Shaped Element (DB) is generally demonstrated in FIG. 2*b* as comprising Middle (MP), Outer (OP) and Inner Surface (INS) portions, (which Inner Surface (INS) can be, at its outer extents, of a more tapered shape as indicated by the dashed lines, such that when said more tapered Inner Surface (INS) regions engage the Continuous Chain Channel Guide (CG) on both sides of a Slit (S), energy stored in the Continuous Chain Channel Guide (CG) aides with forcing the Dumbell (DB) away from said Slit (S) when progressing from a FIG. 3 to a FIG. 4 position. Continuing, note in FIG. 4 that the Continuous Chain Channel Guide (CG) is shown to be offset, one side of the Slit (S) to the other. However, FIG. 3 shows that sliding the Dumbell Shaped Element (DB) to the right, causes it to effect alignment of the Continuous Chain Channel Guide (CG) on both sides of the Slit (S). Note that the Middle Portion (MP) of the Dumbell Shaped Element (DB) is shown in FIGS. 3 and 4 as dashed lines. Also note where the Inner Surface (INS) of the Dumbell Shaped Element contacts the Continuous Chain Channel Guide (CG) and, as alluded to, realize that a more tapered shape can be utilized to aid with smoothly aligning the two sides of the Channel Guide (CG) on either side of the Slit (S), as shown in FIG. 4. Note that the Continuous Chain Channel Guide (CG) side displacement is limited by the width of FIG. 1*c* demonstrated Chain Link Mating Elements (CLM) and rivets (R), and that the Dumbell Shaped Element (DB) Inner Surface (INS) Taper permits easy reset of the FIG. 4 demonstrated Continuous Chain Channel Guide (CG) displacement. That is, spring force in the Elongated Support (ES) above the the horizontal slit (DEG), and when present Optional Slit (OSS), provides reset driving force where the Continuous Chain Channel Guide (CG) containing element is biased to return to its preferred FIG. 4 free state. (Note the FIG. 2*a* Optional Slit (OSS) is indicated if the Dumbell Guide (DBG) "slit" does not allow sufficient compliance to enable easy Continuous Chain Channel Guide (CG) offset between states demonstrated in FIGS. 3 and 4.

For completeness, FIG. 2*a* also indicates the presence of a slot (LG) which is present in all chain saws, and is used in adjusting tension of chains therein. Slot (LG) is not a new element of the present invention system.

Further, it is within the scope of the present invention to provide a Continuous Chain Channel Guide Alignment Means which comprises only one side, (eg. only the Right Side (RS) or Left Side (LS)), of the Dumbell Shaped Element (DB) and still be functional. That is, a Dumbell Element (DB) can be single sided, (Half-a-Dumbell shaped), where appropriate securing means are present. For insight to what the terminology "Half-a-Dumbell shaped" identifies it should be understood that deleting the Left Side (LS) or Right Side (RS), but not both, of the Dumbell (DB) shown in in FIG. 3 or 4 results in a "Half-a-Dumbell". Note that a half-Dumbell mounted internal to the Motor Housing (H) would be practical as there would be no required protrusion into the say kerf. That is, it is not necessary for a Dumbell Element (DB), or functionally equivalent element, to be of a shape so as to cradle the Continuous Chain Channel Guide (CG) on two sides in the vicinity of a Slit (S), to be within the scope of the present invention. This is easily understood as involving a Continuous Chain Channel Guide Alignment Means where only a left (LS) or right (RS) side of the Dumbell Element (DB) in FIG. 2*b*, but not both, are present.

It is emphasized at this point that a present invention system will typically provide that a Continuous Chain Channel Guide (CG) be manufactured to present as shown in FIG. 4, when a Chain Saw (CS) is not being used. That is, the present invention provides that the Continuous Chain Channel Guide (CG), one side of the Slit (S) to the other, will be manufactured to be fixed in a relative offset position such that a Chain Link Mating element (CLM) mounted in the Continuous Chain Channel Guide (CG) will be impeded from sliding past said Slit (S) until a user causes the Continuous Chain Channel Guide (CG), one side of the Slit to the other, to become aligned as shown in FIG. 3. (Again, a horizontal slit (OSS) as shown in FIG. 2*a* might be required to effect this embodiment to increase Continuous Chain Channel Guide (CG) flexibility). Said offset Continuous Chain Channel Guide (CG) "impedance" comprises a Braking Force and is the underlying principal of operation of the present invention. The offset of the Continuous Chain Channel Guide (CG), one side of the Slit (S) to the other, it will be easily appreciated then, serves to impede Chain Link Mating Elements (CLM) in links in a Chain Saw Chain, which otherwise slide in said Continuous Chain Channel Guide (CG), from easily sliding across said Slit (S), until a user causes alignment, as shown in FIG. 3. As indicated, a prefered Alignment means is a Dumbell Shaped Element (DB), as shown in FIG. 2*b*. In use the Middle Portion (MP) of said Dumbell (DB) is slideably positioned in Dumbell Guide (DBG) of FIG. 2*a*, and the Dumbell Element (DB) Outer Portions (OP) extend so as to encompass the upper Continuous Chain Channel Guide (CG) containing portion of the Elongated Support (ES), (which are better shown in FIGS. 1*b* and 6).

Figure 6:
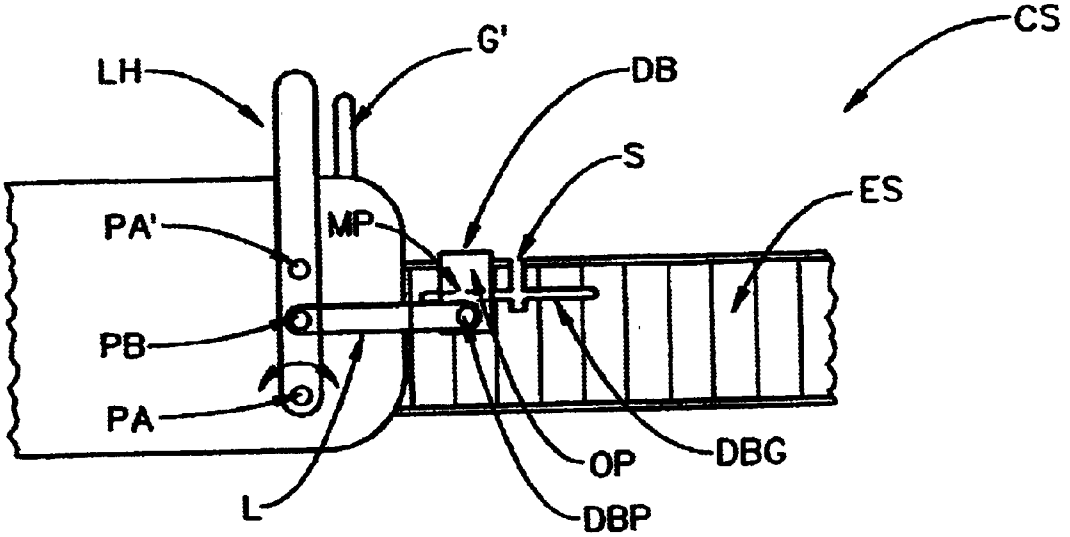
FIG. 6 provides an enlarged view of the present invention elements as identified in FIG. 1*b*.

Continuing, FIG. 1*b* shows a side elevation view of a Chain Saw (CS), much as shown in FIG. 1*a* but with functionally demonstrative present invention system Slit (S), Dumbell shaped element (DB), Linkage (L), and Leverage Handle (LH) added thereto. FIG. 6 provides an expanded view showing how the Leverage Handle (LH) can be pivotally mounted to the Chain Saw (CS) Motor (M) housing (H) via Pivot (PA), (or (PA') depending on which direction the Leverage Handle (LH) is to move during operation of the braking effect), and that Pivot (PB) provides interconnection to Linkage (L) which in-turn is pivotally attached to Dumbell Pivot (DBP), (which can be a loosely affixed connector as opposed to a firm pivot connector system), and Dumbell Shaped Element (DB), which is slidably mounted in the Dumbell Guide (DBG). The preceding discussion of FIGS. 3 and 4 provide insight that movement of the FIG. 6 Leverage Handle (LH) will cause it to pivot about Pivot (PA), (or PA'), and that will cause the Dumbell Shape Element (DB) to move between the states indicated in FIGS. 3 and 4. Note also that while FIG. 1*b* shows preferred relative orientation of the Leverage Handle (LH) and the Dumbell Guide (DBG), any functional relative orientation therebetween can be utilized.

Figure 5A:
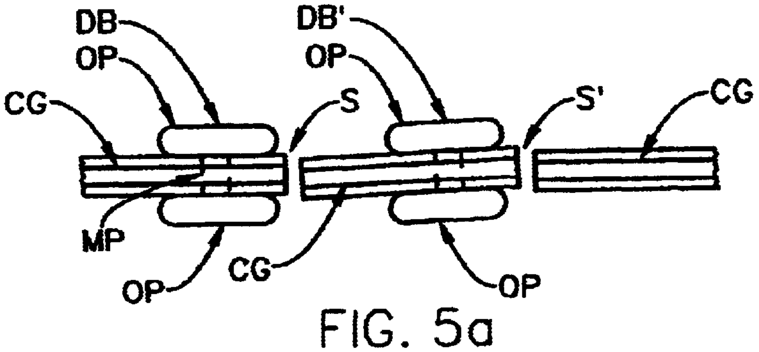
FIG. 5*a* shows an enlarged Top view of a scenario similar to that in FIG. 4, but for a double Slit (S) arrangement.
Figure 5B:
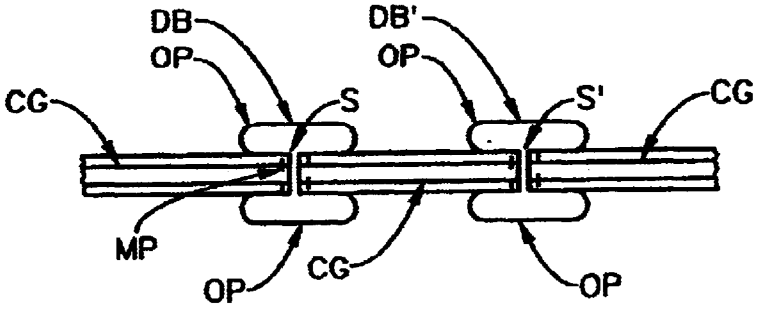
FIG. 5*b* shows an enlarged Top view of a scenario similar to that in FIG. 3, but for a double Slit (S) arrangement.

FIGS. 5*a* and 5*b* show another variation of the present invention wherein two slits (S) and (S') are present in the Elongated Support (ES) in the region of the upper Continuous Chain Channel Guide (CG), and two Dumbell Shaped Elements (DB) and (DB') are present. It is to be understood that additional linkage, (not shown, but can be internal so as not to interfere with the kerf, or can be out of the kerf inside the motor housing), which can be similar to that shown for the single Dumbell Shaped Element (DB) case in FIGS. 1*b* and 6, will be required to cause the second Dumbell Shaped Element (DB') to move as indicated in FIGS. 5*a* and 5*b*. As well, it is noted that a single Dumbell Shaped Element (DB), or functional equivalent, can suffice even in the presently disclosed embodiment, as aligning the Continuous Chain Channel Guide (CG) on both sides of one Slit (S) will tend to align it on both sides of the second Slit (S').

Figure 5C:
FIGS. 5*c* and 5*d* demonstrate a Continuous Chain Channel Guide (CG') which contains a collapsible region (COL) situated in non-collapsed and collapsed configurations respectively.
Figure 5D:

As additional insight, FIGS. 5*c* and 5*d* demonstrate a Continuous Chain Channel Guide (CG') which contains a Collapsible region (COL), in non-collapsed and collapsed configurations respectively. Said Collapsible region (COL) can be comprised of laminations which various activating means can cause to move and thereby collapse the Continuous Chain Channel Guide (CG'), but which laminations retain memory and so return to their "un-collapsed" shape when collapsing force is removed. Said alternative "means which allows effecting an impeded chain channel guide from one side thereof to the other", is to be considered within the scope of the claimed invention as functionally essentially equivalent to the Silt (S) as in use it serves to stop a chain saw chain from sliding therein. It is noted that only one side of the Continuous Chain Channel Guide (CG') as shown in FIGS. 5*c* and 5*d* might be made collapsible and remain in the scope of the present invention, or that the Collapsible region (COL) can simply comprise a movable portion of the wall on one side of the Continuous Chain Channel Guide (CG'). Any functional linkage can be applied to effect the action demonstrated in FIGS. 5*c* and 5*d*.

Figure 5E:
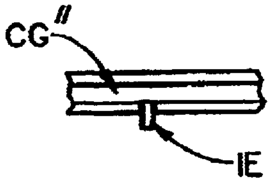
FIGS. 5*e* and 5*f* shows alternative means for impeding a chain saw chain slideability in a Continuous Chain Channel Guide (CG"), comprising an insertion element (IE).
Figure 5F:
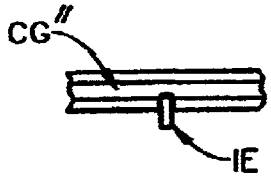

FIGS. 5*e* and 5*f* show yet another alternative means for impeding a chain saw chain slideability in a Continuous Chain Channel Guide (CG"), comprising an Insertion Element (IE) which can be entered and removed to the Continuous Chain Channel Guide (CG") via a means for entering said insertional element, (eg. a hole in the wall of the Continuous Chain Channel Guide (CG")), by any functional linkage. Note that the Insertion Element (IE) can simply comprise a small part of the wall of the Continuous Chain Channel Guide (CG"), which wall is laterally movable.

FIGS. 1–6 serve to show how the present invention functions with relevant examples. However, it can be appreciated that if the means for impeding a chain saw chain slideability in a Continuous Chain Channel Guide (CG), (eg. Slit (S) and associated Dumbell Guide (DBG), Dumbell Shaped Element (DB) and Linkage (L)), are positioned within the Motor Housing (H), they would be less susceptible to damage. Further it is emphasized that any functional linkage between the Leverage Handle (LH), or a functional equivalent thereto, can be substituted in FIGS. 1*b*, 6 and 7 and the result will remain within the scope of the present invention. For instance, the Leverage Handle (LH) could be mounted to a Chain Saw Power Head, Cutter bar, etc. That is, it is primarily the functional chain saw chain motion impedance effecting means in the Elongated Support (ES), typically in the region of the upper Continuous Chain Channel Guide (CG), and functional utility provided thereby, which comprises the novelty in the present invention.

Figure 7:
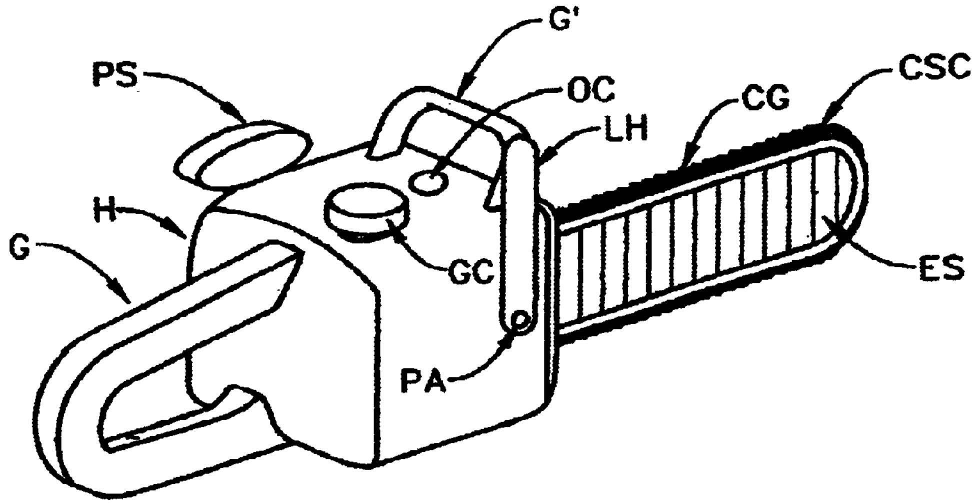
FIG. 7 shows a modified embodiment of the present invention wherein the Slit (S) and Dumbell Guide (DBG) etc. are present inside the Motor containing Housing (H).

FIG. 7 shows a modified embodiment of the present invention implying, by the presence of the Leverage Handle (LH), that all the other elements, (eg. (S), (DBG) and (DB)), are present inside the protective motor containing Housing (H).

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the Claims.

What is claimed is:

1. A chain saw comprising a housing, a chain comprised of links which include chain link mating elements and cutters, and an elongated support extending outward from inside said housing, in the outer surface of said elongated support there being present a continuous chain channel guide into which said chain link mating elements are slidably inserted, such that during normal operation said chain link mating elements slide essentially freely through said continuous chain channel guide, said continuous chain channel guide having a slit present therein which allows effecting an offset of said continuous chain channel guide from one side of said slit to the other, said offset, when present, serving to impede the slideability of said chain link mating elements across said slit, said chain saw further comprising an adjustable continuous chain channel guide alignment means for aligning the sides of said slit, said continuous chain channel guide being in an offset position, from one side of said slit to the other, unless a user causes it to be aligned by adjusting the continuous chain channel guide alignment means, thereby providing a chain saw which impedes the slideability of said chain link mating elements across said slit until said slidability is desired by a user.

2. A chain saw as in claim 1, in which the continuous chain channel guide alignment means is a dumbell shaped element slideably mounted in the elongated support, such that in use said dumbell shaped element causes alignment of the continuous chain channel guide from one side of the slit to the other, when caused to be located at said slit.

3. A chain saw as in claim 1, which further comprises a second slit in said continuous chain channel guide which allows effecting an offset of said continuous chain channel guide from one side of said second slit to the other, said chain saw further comprising a second adjustable continuous chain channel guide alignment means for aligning the sides of said second slit, said continuous chain channel guide being offset from one side of said second slit to the other, unless a user causes it to be aligned by adjusting the second continuous chain channel guide alignment means, thereby providing a chain saw which impedes the slideability of said chain link mating elements across said second slit until said slidability is desired by a user.

4. A chain saw as in claim 3, in which the continuous chain channel guide alignment means for aligning the sides of said second slit is a dumbell shaped element slideably mounted in the elongated support, such that in use said dumbell shaped element causes alignment of the continuous chain channel guide from one side of the second slit to the other, when caused to be located at said second slit.

5. A chain saw comprising a housing, a chain saw chain comprised of links which include chain link mating elements and cutters, and an elongated support extending outward from inside said housing, in the outer surface of said elongated support there being present a continuous chain channel guide into which said chain link mating elements are slidably inserted, such that during normal operation said chain link mating elements slide essentially freely through said continuous chain channel guide, said continuous chain channel guide having means present therein which effect an impeded chain channel guide, said means to effect an impeded chain channel guide serving to, when operated, impede the slideability of said chain saw chain in said continuous chain channel guide, said means to effect an impeded chain channel guide comprising at least one slit laterally thereacross, said chain saw further comprising an adjustable continuous chain channel guide alignment means for aligning the sides of said slit;

said chain channel guide being in a position selected from the group consisting of:

continuous from one side of said at least one slit to the other, and offset from one side of said at least one slit to the other, unless a user causes the channel guide on each side of said at least one slit to be positioned as:

offset from one side of said at least one slit to the other, and continuous from one side of said at least one slit to the other, respectively, by adjusting the continuous chain channel guide alignment means.

6. A chain saw as in claim 5, in which the continuous chain channel guide alignment means is a dumbell shaped element slideably mounted in the elongated support, such that in use said dumbell shaped element causes alignment of the continuous chain channel guide from one side of said at least one slit to the other, when caused to be located at said at least one slit.

7. A chain saw comprising a housing, a chain comprised of links which include chain link mating elements and cutters, and an elongated support extending outward from inside said housing, in the outer surface of said elongated support there being present a continuous chain channel guide into which said chain link mating elements are slidably inserted, such that during normal operation said chain link mating elements slide essentially freely through said continuous chain channel guide, said continuous chain channel guide having a slit present therein which allows effecting an offset of said continuous chain channel guide from one side of said slit to the other, said offset, when present, serving to impede the slideability of said chain link mating elements across said slit, said chain saw further comprising an adjustable continuous chain channel guide alignment means for aligning the sides of said slit, said continuous chain channel guide being in a continuous position, from one side of said slit to the other, unless a user causes it to be offset by adjusting the continuous chain channel guide alignment means, thereby providing a chain saw which allows the slideability of said chain link mating elements across said slit until impedance thereof is desired by a user.

8. A chain saw as in claim 7, in which the continuous chain channel guide alignment means is a dumbell shaped element slideably mounted in the elongated support, such that in use said dumbell shaped element causes alignment of the continuous chain channel guide from one side of the slit to the other, when caused to be located at said slit.

9. A chain saw as in claim 7, which further comprises a second slit in said continuous chain channel guide which allows effecting an offset of said continuous chain channel guide from one side of said second slit to the other, said chain saw further comprising a second adjustable continuous chain channel guide alignment means for aligning the sides of said second slit, said continuous chain channel guide being continuous from one side of said second slit to the other, unless a user causes it to be offset by adjusting the second continuous chain channel guide alignment means, thereby providing a chain saw which allows the slideability of said chain link mating elements across said second slit until impedance thereof is desired by a user.

10. A chain saw as in claim 7, in which the continuous chain channel guide alignment means for aligning the sides of said second slit is a dumbell shaped element slideably mounted in the elongated support, such that in use said dumbell shaped element causes alignment of the continuous chain channel guide from one side of the second slit to the other, when caused to be located at said second slit.

11. A chain saw as in claim 9, in which the continuous chain channel guide alignment means for aligning the sides of said second slit is a dumbell shaped element slideably mounted in the elongated support, such that in use said dumbell shaped element causes alignment of the continuous chain channel guide from one side of the second slit to the other, when caused to be located at said second slit.

* * * * *